(12) United States Patent
Pringle, IV et al.

(10) Patent No.: US 10,328,456 B2
(45) Date of Patent: Jun. 25, 2019

(54) RESIN APPLICATION TIP FOR A CUT EDGE

(71) Applicant: The Boeing Company, Chicago, IL (US)

(72) Inventors: John Walter Pringle, IV, Gardena, CA (US); Martin Hanna Guirguis, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 434 days.

(21) Appl. No.: 14/859,929

(22) Filed: Sep. 21, 2015

(65) Prior Publication Data

US 2017/0080453 A1    Mar. 23, 2017

(51) Int. Cl.
*B05D 1/26* (2006.01)
*B05B 12/02* (2006.01)
*B05C 17/005* (2006.01)

(52) U.S. Cl.
CPC .............. *B05D 1/26* (2013.01); *B05B 12/02* (2013.01); *B05C 17/00516* (2013.01)

(58) Field of Classification Search
None
See application file for complete search history.

(56) References Cited

U.S. PATENT DOCUMENTS

| | | | | |
|---|---|---|---|---|
| 5,298,072 A * | 3/1994 | Schiele | ................ | B05C 5/0204 118/314 |
| 6,001,181 A * | 12/1999 | Bullen | ................ | B05C 5/0216 118/323 |
| 8,651,046 B1 | 2/2014 | Davancens et al. | | |
| 9,016,530 B2 | 4/2015 | Topf et al. | | |
| 2008/0128430 A1* | 6/2008 | Kovach | ................ | B32B 27/00 220/586 |
| 2009/0123653 A1* | 5/2009 | Chenebaud | ........... | B05C 5/0204 427/385.5 |
| 2011/0159229 A1* | 6/2011 | Doehle | .................... | C09D 5/03 428/81 |
| 2015/0044376 A1 | 2/2015 | Topf et al. | | |

OTHER PUBLICATIONS

"Cartridge Nozzles from Adhesive Dispensing Techcon Semco," Adhesive Dispensing Ltd., copyright 2015, 5 pages, accessed Aug. 11, 2015. http://www.adhesivedispensing.co.uk/cartridgenozzles29c.asp.

* cited by examiner

*Primary Examiner* — James Mellott
(74) *Attorney, Agent, or Firm* — Yee & Associates, P.C.

(57) ABSTRACT

A method and apparatus for applying resin to a cut edge of a composite structure, the cut edge having exposed carbon fibers. The method comprises scanning the cut edge of the composite structure with a vision system to form scanned data. The method further determines an application path for the cut edge of the composite structure using the scanned data. The method also applies the resin to the cut edge of the composite structure by controlling movement of an application tip along the application path using a controller.

18 Claims, 14 Drawing Sheets

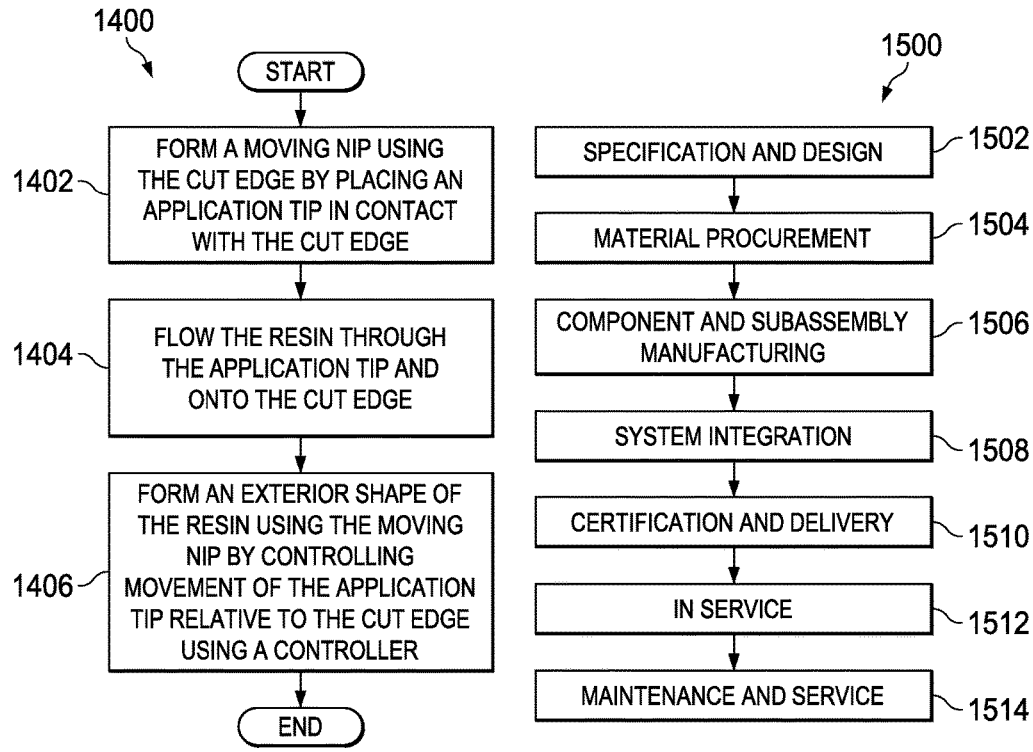
FIG. 14
FIG. 15
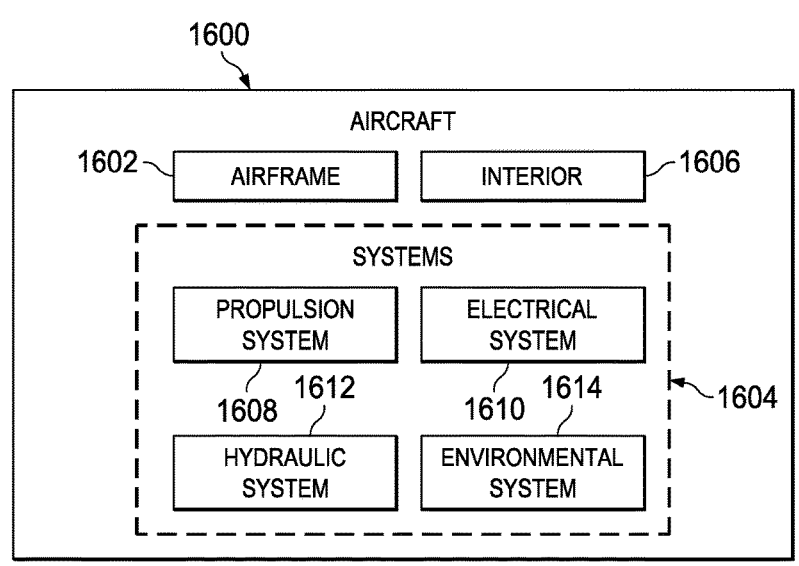
FIG. 16

RESIN APPLICATION TIP FOR A CUT EDGE

BACKGROUND INFORMATION

1. Field

The present disclosure relates generally to sealing and, in particular, to applying a resin. More particularly, the present disclosure relates to a method and apparatus for applying resin to a cut edge of a composite structure having exposed carbon fibers using a resin application tip.

2. Background

Composite structures may have complex shapes. Complex shapes may include cutouts or other shapes formed by trimming. After curing, the cured composite structure may then be trimmed. Trimming the cured composite structure may create a cut edge with exposed carbon fibers. Leaving carbon fibers exposed may have undesirable results. For example, exposed carbon fibers may oxidize. Oxidation of the carbon fibers may be undesirable. As a further example, exposed carbon fibers may have undesirable reactions to metals such as aluminum. As another example, the cut edge may undesirably absorb moisture.

A seal may be used to cover a cut edge of the cured composite structure. A seal may prevent or reduce undesirable conditions along the cut edge. A seal may block fluids from being absorbed by the cut edge. A seal may prevent the exposed carbon fibers from oxidizing.

A seal may be formed by applying resin to the cut edge. A seal may not only have desired material properties, but also a desired shape.

Currently, an operator may perform a series of steps to prepare a structure, apply the resin to the structure, and shape the resin. For example, an operator may mask the composite structure prior to applying the resin. After applying the resin, the operator may then manually shape the resin using a spatula or brush.

An operator performing multiple steps may take an undesirable amount of time. Further, an operator performing multiple steps may use an undesirable amount of labor. Yet further, a manually shaped resin may have a higher likelihood of shape deviations. A manually shaped resin bead may have undesirable quality.

Some cut edges of cured composite structures may have complex geometries. When the cut edge has complex geometries, such as mouseholes, it may be more difficult than desired to apply resin to the structure.

Therefore, it would be desirable to have a method and apparatus that take into account at least some of the issues discussed above, as well as other possible issues. For example, it may be desirable for a resin shape to be repeatable and consistent. Yet further, it may be desirable to reduce an amount of time to form a seal.

SUMMARY

In an illustrative embodiment, a method of applying resin to a cut edge of a composite structure, the cut edge having exposed carbon fibers, may be provided. The method may comprise scanning the cut edge of the composite structure with a vision system to form scanned data. The method may also determine an application path for the cut edge of the composite structure using the scanned data. The method may further apply the resin to the cut edge of the composite structure by controlling movement of an application tip along the application path using a controller.

A further illustrative embodiment of the present disclosure may provide a sealing system. The sealing system may comprise a tool, a controller, and an application tip. The tool may have a nozzle and a resin source. The controller controls movement of the tool and flow of resin from the resin source. The application tip is connected to the nozzle of the tool and is for applying resin to a cut edge of a composite structure, the cut edge having exposed carbon fibers.

A yet a further illustrative embodiment of the present disclosure may provide a sealing system. The sealing system may comprise an application tip and a controller. The application tip may comprise a housing having a channel that extends through a first end of the housing towards a second end of the housing and interfaces with an orifice. The orifice may be positioned between the first end and the second end. The orifice may be concentric with an indentation. The second end may include a stop having a thickness sufficient to direct resin towards the orifice. The controller may control movement of the application tip relative to a cut edge of a composite structure to apply the resin.

In yet another illustrative embodiment, a method of applying resin to a cut edge of a composite structure, the cut edge having exposed carbon fibers, may be provided. The method may comprise forming a moving nip using the cut edge by placing an application tip in contact with the cut edge. The method may comprise flowing the resin through the application tip and onto the cut edge. The method may also comprise forming an exterior shape of the resin using the moving nip by controlling movement of the application tip relative to the cut edge using a controller.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a flowchart of a process for applying resin to a cut edge of a composite structure in accordance with an illustrative embodiment;

FIG. 15 is an illustration of an aircraft manufacturing and service method in the form of a block diagram in accordance with an illustrative embodiment; and FIG. 16 is an illustration of an aircraft in the form of a block diagram in which an illustrative embodiment may be implemented.

DETAILED DESCRIPTION

Figure 1:
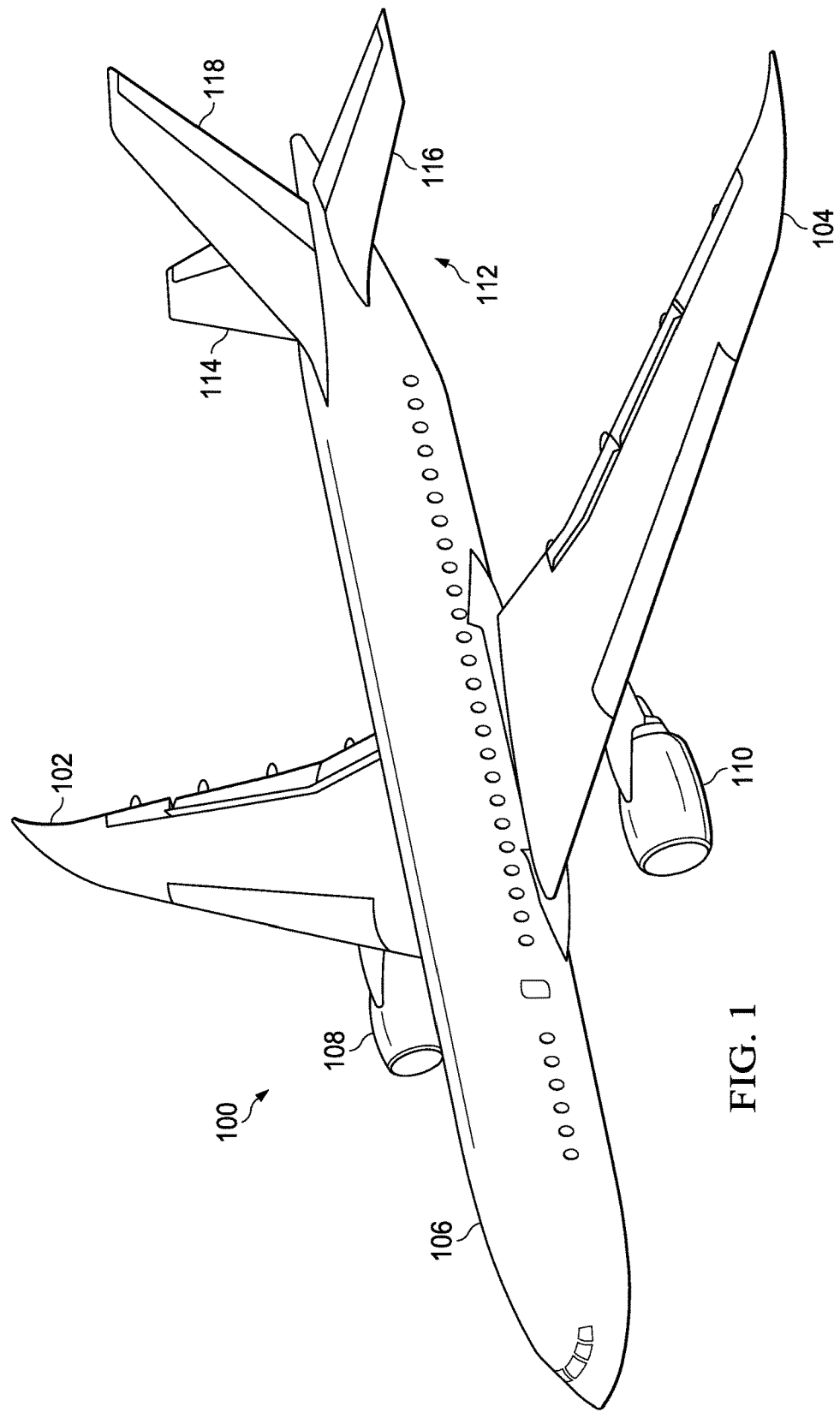
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having cut edges to which resin may be applied using an application tip in accordance with an illustrative embodiment. For example, a portion of body 106 may have a cured composite structure with a cut edge. The cut edge may be sealed with resin in accordance with an illustrative embodiment.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, and other suitable types of aircraft.

Figure 2:
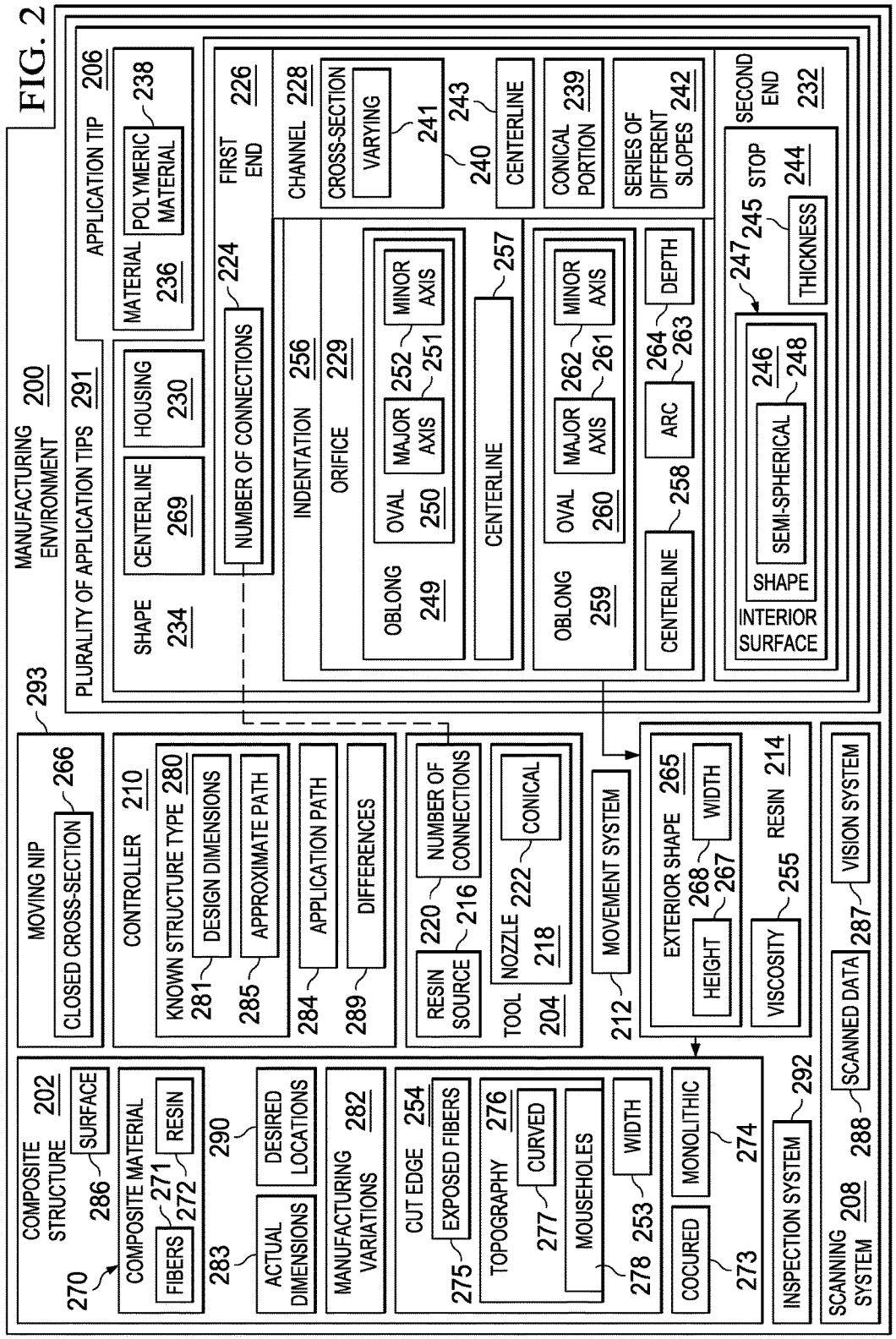
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to apply a resin to a component of aircraft 100.

Manufacturing environment 200 includes composite structure 202, tool 204, application tip 206, scanning system 208, controller 210, and movement system 212. Tool 204 and application tip 206 may be used to apply resin 214 to composite structure 202. Resin 214 may be supplied by resin source 216 of tool 204. Tool 204 may also include nozzle 218 and number of connections 220. As used herein, a "number of" items may include one or more items. In this manner, number of connections 220 means one or more connections. In some examples, nozzle 218 may be conical 222.

Application tip 206 may interface with nozzle 218. Application tip 206 may be placed relative to nozzle 218 and connected to tool 204 using number of connections 220 and number of connections 224. Number of connections 224 of first end 226 of application tip 206 may interface with number of connections 220 to connect application tip 206 to tool 204.

When application tip 206 is connected to tool 204, resin 214 may flow from resin source 216 through nozzle 218 and into application tip 206. Resin 214 may then flow through application tip 206 to composite structure 202. More specifically, resin 214 may flow through channel 228 and orifice 229 of application tip 206 to composite structure 202.

Application tip 206 may have housing 230 having channel 228 that extends through first end 226 of housing 230 towards second end 232 of housing 230. Housing 230 may have shape 234. Shape 234 may be influenced by an intended use, a desirable weight for application tip 206, a desirable cost for application tip 206, the shape of tool 204, characteristics of composite structure 202, or any other desirable characteristic.

Housing 230 may be formed of material 236. Material 236 may be selected based on at least one of cost, machinability, manufacturability, melting point, weight, surface wettability, interaction with resin 214, or any other desirable characteristic. As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In some illustrative examples, material 236 may be selected such that it may be injection molded. In some illustrative examples, material 236 may take the form of polymeric material 238.

Housing 230 may have first end 226 and second end 232 opposite of first end 226. Shape 234 may include both first end 226 and second end 232. Channel 228 may extend through housing 230 from first end 226 towards second end 232. First end 226 has number of connections 224 to interface with nozzle 218 of tool 204. Channel 228 may have conical portion 239 that is complementary to nozzle 218 when nozzle 218 is conical 222.

Channel 228 may have cross-section 240. In some illustrative examples, cross-section 240 may be varying 241. In these illustrative examples, cross-section 240 may be referred to as a varying cross-section. For example, channel 228 may have series of different slopes 242 to provide consistent flow of resin 214. When channel 228 has series of different slopes 242, cross-section 240 may be varying 241.

Channel 228 may have centerline 243. At least one of cross-section 240, series of different slopes 242, or centerline 243 of channel 228 may be selected such that a desired amount of resin 214 is provided to composite structure 202. At least one of cross-section 240, series of different slopes 242, or centerline 243 of channel 228 may be selected such that resin 214 is applied to a desired location of composite structure 202. In some illustrative examples, series of different slopes 242 may provide consistent flow of resin 214.

It may desirable to make second end 232 smaller than first end 226 such that maneuverability of second end 232 may be desirable relative to composite structure 202. Second end 232 may include stop 244. Stop 244 may have thickness 245 and interior surface 246. Thickness 245 may be sufficient to direct resin 214 towards orifice 229. Stop 244 may be of sufficient thickness 245 such that resin 214 doesn't penetrate second end 232 of housing 230.

Interior surface 246 of second end 232 may have shape 247 selected to provide consistent flow of resin 214. In some illustrative examples, interior surface 246 of second end 232 may be semi-spherical 248.

Interior surface 246 of second end 232 may direct resin 214 towards orifice 229 in housing 230. Orifice 229 may be oblong 249. In some illustrative examples, orifice 229 may be oval 250 with major axis 251 and minor axis 252. At least one of major axis 251 or minor axis 252 may be selected based on characteristics of at least one of composite structure 202 or resin 214. For example, at least one of major axis 251 or minor axis 252 may be selected based on at least one of width 253 of cut edge 254 of composite structure 202 or viscosity 255 of resin 214.

Orifice 229 may be positioned in indentation 256 in housing 230. Orifice 229 may have centerline 257 while orifice 229 has centerline 258. Orifice 229 may be concentric with indentation 256 when centerline 257 and centerline 258 are the same.

Indentation 256 may be oblong 259. In some illustrative examples, indentation 256 may be oval 260 with major axis 261 and minor axis 262. At least one of major axis 261 or minor axis 262 may be selected based on characteristics of at least one of composite structure 202 or resin 214. For example, at least one of major axis 261 or minor axis 262 may be selected based on at least one of width 253 of cut edge 254 of composite structure 202 or viscosity 255 of resin 214.

Indentation 256 may form arc 263 in housing 230. Indentation 256 may also have depth 264.

Indentation 256 may affect exterior shape 265 of resin 214. For example, a portion of indentation 256 may contact a portion of cut edge 254 of composite structure 202 as application tip 206 moves relative to composite structure 202 to form closed cross-section 266. Closed cross-section 266 may be used to form resin 214 between cut edge 254 of composite structure 202 and application tip 206. In some examples, application tip 206 and composite structure 202 may function as a type of moving nip 293 to form closed cross-section 266 for creating exterior shape 265 of resin 214. Indentation 256 may be configured to form exterior shape 265 of resin 214 as application tip 206 deposits resin 214.

Exterior shape 265 may include height 267 and width 268. Height 267 may be affected by at least one of width 253 of cut edge 254 or depth 264 of indentation 256. In some illustrative examples, height 267 of exterior shape 265 of resin 904 may also be referred to as a thickness of resin 904. Height 267 may extend outward from cut edge 254 of composite structure 202.

Width 268 may be affected by width 253 of cut edge 254. For example, it may be desirable to cover substantially all of cut edge 254 with resin 214.

By contacting cut edge 254 of composite structure 202, indentation 256 may prevent or substantially discourage resin 214 from extending past a desirable area of composite structure 202. Contact between indentation 256 and composite structure 202 may be used instead of masking areas of composite structure 202 where it would be undesirable to have resin 214. Using application tip 206 may thus reduce manufacturing time by reducing or eliminating the need for masking or removal of excess resin 214 on composite structure 202.

In some illustrative examples, indentation 256 may not contact cut edge 254 of composite structure 202. In these illustrative examples, indentation 256 may be held a desirable distance from cut edge 254. Exterior shape 265 of resin 214 may be influenced by at least one of the shape of indentation 256, the shape of orifice 229, the distance of indentation 256 from cut edge 254, the volumetric flow rate of resin 214, and viscosity 255 of resin.

Indentation 256 and orifice 229 may not be concentric with channel 228. For example, centerline 257 and centerline 258 may be at an angle relative to centerline 243. In some illustrative examples, centerline 257 and centerline 258 may be substantially perpendicular to centerline 243. Centerline 243 may extend substantially parallel to centerline 269 of shape 234 of housing 230.

Application tip 206 may apply resin 214 to cut edge 254 of composite structure 202 through orifice 229 of housing 230. Composite structure 202 may be formed by laying up composite material 270. Composite material 270 may include fibers 271 and resin 272. After being laid up, composite material 270 may then be cocured 273. By being cocured 273, composite material 270 of composite structure 202 may be bonded together to form one piece. When composite structure 202 is cocured 273, composite structure 202 may be referred to as monolithic 274.

After composite structure 202 is cocured 273, composite structure 202 may be trimmed to form cut edge 254. By trimming composite structure 202, fibers 271 may be trimmed to form exposed fibers 275.

Exposed fibers 275 may undergo oxidation or other undesirable processes. It may be desirable to cover exposed fibers 275 with resin 214 using application tip 206. Exposed fibers 275 may be formed of any desirable material. In some illustrative examples, exposed fibers 275 may include exposed carbon fibers.

Cut edge 254 may also have topography 276. In some illustrative examples, cut edge 254 may be curved 277. In some illustrative examples, cut edge 254 may have features such as mouseholes 278. Mouseholes 278 may be relatively small notches or cutouts in composite structure 202. Application tip 206 may be designed to apply resin to topography 276, such as mouseholes 278. Second end 232 may be sized to maneuver desirably within topography 276 such as mouseholes 278. Second end 232 may be designed to rotate and maneuver desirably in tight spaces. For example, second end 232 may be designed to rotate and maneuver within mouseholes 278 that have tight radii.

Composite structure 202 may be known structure type 280. For example, known structure type 280 may take the form of a portion of wing 102 of FIG. 1. As another example, known structure type 280 may take the form of a portion of body 106 of FIG. 1. Design dimensions 281 of known structure type 280 may be known prior to application of resin 214 to composite structure 202. Composite structure 202 may have manufacturing variations 282. Manufacturing variations 282 may cause actual dimensions 283 of composite structure 202 to vary from design dimensions 281.

Manufacturing variations 282 may affect desired movements of application tip 206 to apply resin 214 to composite structure 202.

Prior to applying resin 214, application path 284 for composite structure 202 may be generated. Controller 210 may control movement of application tip 206 according to application path 284.

Application path 284 may be generated by modifying approximate path 285 of known structure type 280. Scanning system 208 may scan surface 286 of composite structure 202 with vision system 287 to form scanned data 288. Scanned data 288 may be a representation of actual dimensions 283 of composite structure 202. Approximate path 285 may be modified using scanned data 288 and design dimensions 281. In some illustrative examples, approximate path 285 may be modified based on differences 289 between Design dimensions 281 and scanned data 288.

Controller 210 may use application path 284 to control movement of application tip 206 to apply resin 214 to desired location 290 on composite structure 202. Desired location 290 for resin 214 on composite structure 202 may be at least a portion of cut edge 254.

In some illustrative examples, application tip 206 may be only one of plurality of application tips 291. Application tip 206 may be selected based on at least one of known structure type 280, approximate path 285, or application path 284. Scanned data 288 may be used to identify a desirable application tip.

In some illustrative examples, exterior shape 265 of resin 214 to be applied to composite structure 202 may be determined based on scanned data 288. In some illustrative examples, exterior shape 265 of resin 214 to be applied to composite structure 202 may be determined based on at least one of known structure type 280 or approximate path 285. Application tip 206 may be selected based on exterior shape 265 of resin 214.

In some illustrative examples, scanning system 208 may be connected to tool 204. In other illustrative examples, scanning system 208 may move independently of tool 204.

Tool 204 may be moved relative to composite structure 202 using movement system 212. Movement system 212 may include a robotic arm or any other desirable form of movement system. Movements of tool 204 may be controlled by controller 210.

Controller 210 may be implemented in software, hardware, firmware, or a combination thereof. When software is used, the operations performed by controller 210 may be implemented in program code configured to run on a processor unit. When firmware is used, the operations performed by controller 210 may be implemented in program code and data and stored in persistent memory to run on a processor unit. When hardware is employed, the hardware may include circuits that operate to perform the operations in controller 210.

Resin 214 may be inspected using inspection system 292 to determine if resin 214 is within selected tolerances. In some illustrative examples, resin 214 may be inspected during application of resin 214 by application tip 206. For example, inspection system 292 may also be connected to tool 204. In other illustrative examples, inspection system 292 may inspect resin 214 after application tip 206 has completed applying resin 214.

In some illustrative examples, inspection system 292 may inspect resin 214 looking for an out of tolerance state in exterior shape 265. In some illustrative examples, inspection system 292 may inspect resin 214 looking for out of tolerance applied resin including at least one of ripples, bubbles, or other features of resin 214. Inspection system 292 may continuously and automatically inspect to determine if resin 214 is within tolerances. Inspection system 292 may inspect for ripples or bubbles by inspecting the interior of resin 214 using x-rays.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although movement system 212 is described as moving application tip 206 relative to composite structure 202, in some illustrative examples, movement system 212 may move composite structure 202 relative to application tip 206. As another illustrative example, application tip 206 may be held at any desirable angle relative to the ground. For example, application tip 206 may be held such that orifice 229 faces the floor of manufacturing environment 200 and gravity aids in pulling resin 214 from orifice 229 onto cut edge 254. In some other examples, application tip 206 may be held such that orifice 229 is at an angle relative to the floor of manufacturing environment 200. In some examples, application tip 206 may be held such that orifice 229 is about 90 degrees from the floor of manufacturing environment 200. Application tip 206 may be held at any desirable angle relative to the floor of manufacturing environment 200, even if gravity would act against resin 214 exiting orifice 229.

Application tip 206 may be formed using any desirable method. Application tip 206 may be formed using additive manufacturing, injection molding, or any other desirable manufacturing method.

As another example, viscosity 255 of resin 214 may be changed during application of resin 214 by heating or cooling resin 214 supplied from resin source 216. Viscosity 255 of resin 214 may be changed by changing the type of resin 214 selected.

Figure 3:
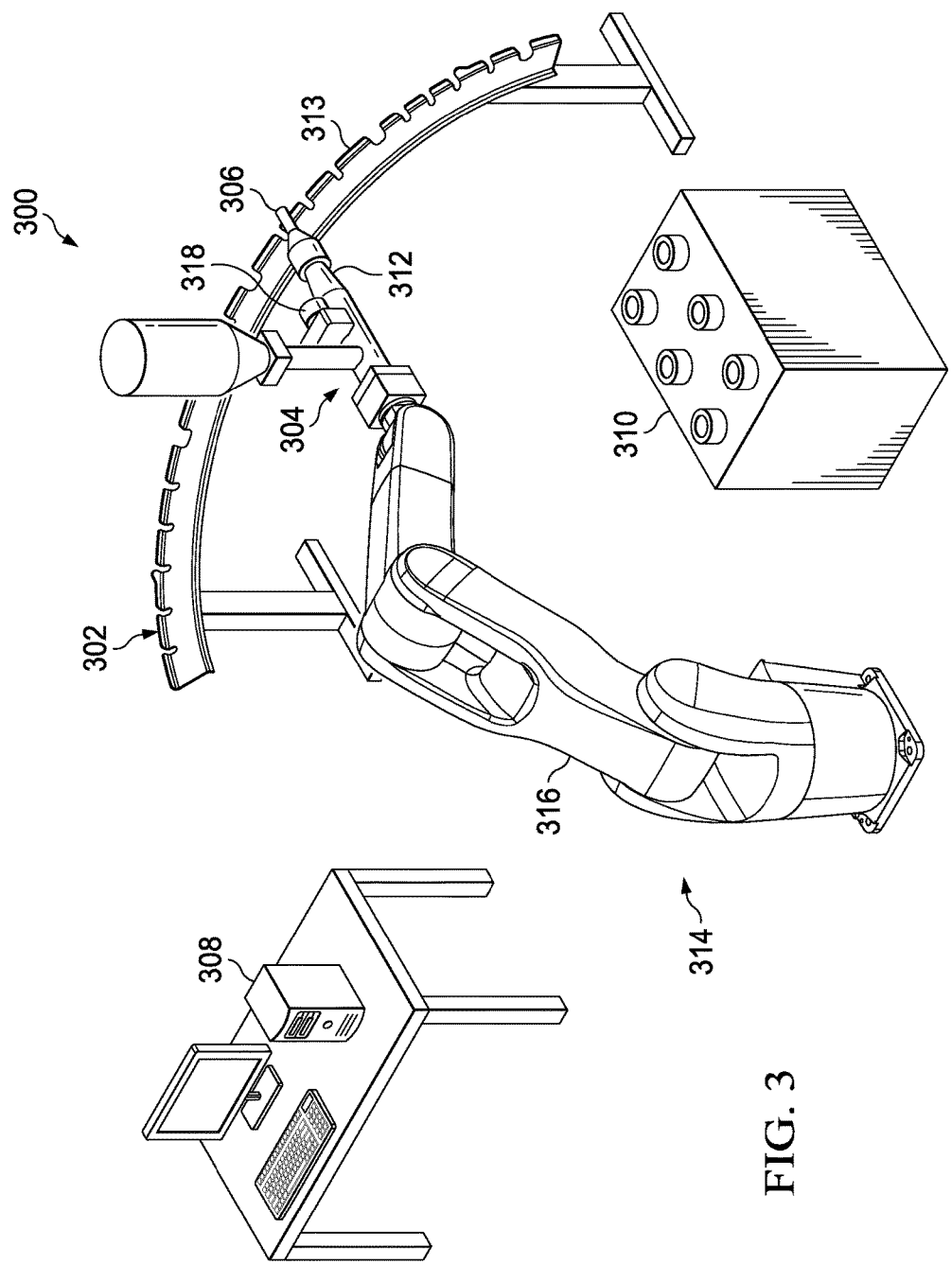
FIG. 3 is an illustration of an isometric view of a manufacturing environment in accordance with an illustrative embodiment.

Turning now to FIG. 3, an illustration of an isometric view of a manufacturing environment is depicted in accordance with an illustrative embodiment. Manufacturing environment 300 may be a physical implementation of manufacturing environment 200 of FIG. 2. Manufacturing environment 300 may be an example of a manufacturing environment for applying resin to an aircraft part during manufacturing of aircraft 100 of FIG. 1.

Manufacturing environment 300 includes structure 302, tool 304, and application tip 306. Controller 308 may be used to control movement of tool 304 relative to at least one of application tip 306 or structure 302. For example, controller 308 may control movement of tool 304 relative to application tip storage 310 to place application tip 306 onto nozzle 312 of tool 304. After application tip 306 is connected to nozzle 312 of tool 304, controller 308 may control movements of application tip 306 and tool 304 relative to structure 302. For example, controller 308 may control movements of application tip 306 relative to structure 302 while application tip 306 deposits resin on cut edge 313 of structure 302.

To control movement of tool 304, controller 308 may send commands to movement system 314. As depicted, movement system 314 may take the form of robotic arm 316.

Controller 308 may also control the speed at which application tip 306 travels relative to structure 302. Controller 308 may also control the volumetric flow of resin from nozzle 312 of tool 304. In some illustrative examples, controller 308 may control the speed at which application tip 306 travels relative to structure 302 based on the volumetric flow of resin from nozzle 312 of tool 304. In some illustrative examples, controller 308 may control the volumetric flow of resin from nozzle 312 of tool 304 based on the speed at which application tip 306 travels relative to structure 302.

Controller 308 may control aspects of application of a resin based on results of at least one sensor. The at least one sensor may include at least one of a gyroscopic sensor, a flow sensor, a vision sensor, an x-ray detector, an inspection system, or any other desirable type of sensor. In some illustrative examples, controller 308 may control at least one of the volumetric flow of resin from nozzle 312, speed at which application tip 306 travels, or direction of movement of application tip 306 based on inspection of the applied resin.

In some illustrative examples, each resin design may have its own desirable application tip 306 speed, resin volumetric flow, or cut edge width. These variables may be determined based on at least one of the portion of structure 302 to receive resin, the shape of application tip 306, the type of resin, and the shape of the resin to be created.

In some illustrative examples, at least one of application tip 306 speed or resin volumetric flow may be a generic value. In these illustrative examples, a generic value may be used unless a specific value is provided for a specific resin application process.

In some illustrative examples, controller 308 may adjust at least one of application tip 306 speed or resin volumetric flow based on the actual performance during application of resin. In some illustrative examples, controller 308 may adjust a desirable value for at least one of application tip 306 speed or resin volumetric flow based on the qualities of the resin after application of the resin.

At least one of the quality or exterior shape of the resin may be inspected during application or after application using inspection system 318. As depicted, inspection system 318 may be connected to tool 304 and moved using movement system 314. In other illustrative examples, inspection system 318 may be moved independently of tool 304. Moving tool 304, using robotic arm 316, may move application tip 306 relative to structure 302.

Figure 4:
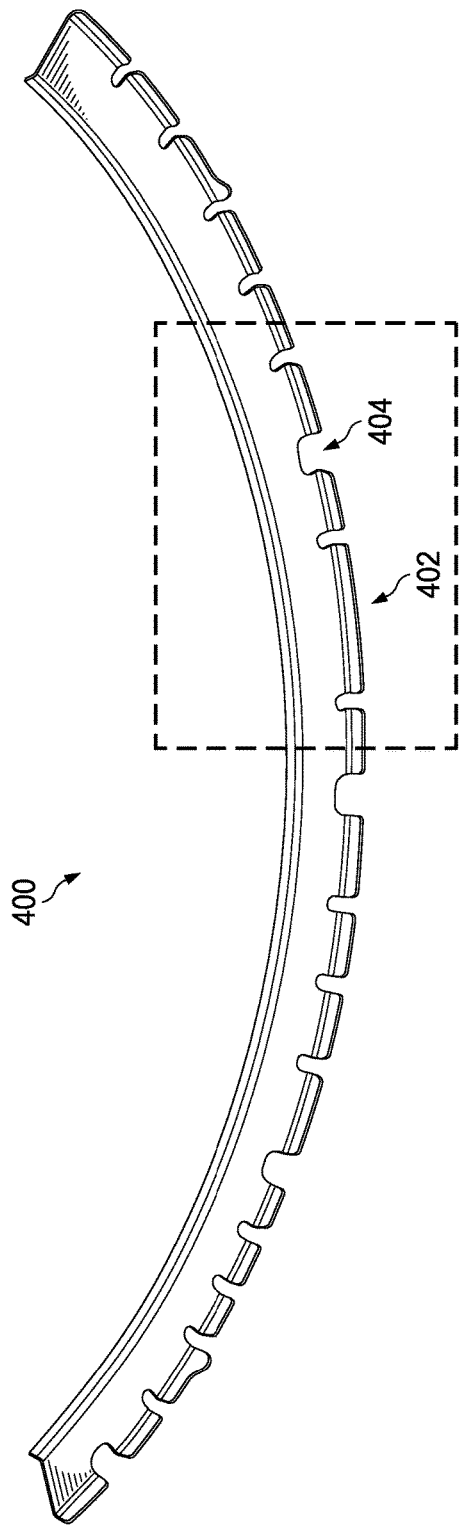
FIGS. 4 and 4A are illustrations of a cured composite structure having a cut edge with exposed carbon fibers in accordance with an illustrative embodiment.
Figure 4A:
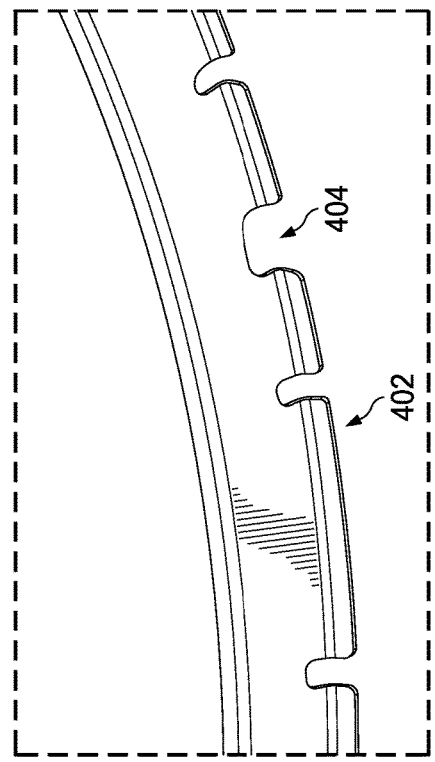

Turning now to FIGS. 4 and 4A, illustrations of a cured composite structure having a cut edge with exposed carbon fibers are depicted in accordance with an illustrative embodiment. Composite structure 400 may be a physical implementation of composite structure 202 of FIG. 2. In some illustrative examples, composite structure 400 may be a component of an aircraft such as aircraft 100 of FIG. 1.

Composite structure 400 has cut edge 402. Cut edge 402 may have exposed carbon fibers. It may be desirable to apply a resin or other sealant to cut edge 402 to cover the exposed carbon fibers.

Cut edge 402 of composite structure 400 may have any desirable shape. Some shapes of cut edge 402 may create smaller movement areas for a respective application tip. In this illustrative example, cut edge 402 may have mouseholes 404. Mouseholes 404 may be number of notches cut into composite structure 400.

FIG. 4A is an illustration of a number of mouseholes on a cut edge in accordance with an illustrative embodiment. FIG. 4A may be a view of composite structure 400 within box 4A of FIG. 4. Mouseholes 404 may include mousehole 406 having corner radius 408. A portion of an application tip (not depicted), such as second end 232 of application tip 206 of FIG. 2, may be designed to maneuver within corner radius 408.

Figure 5:
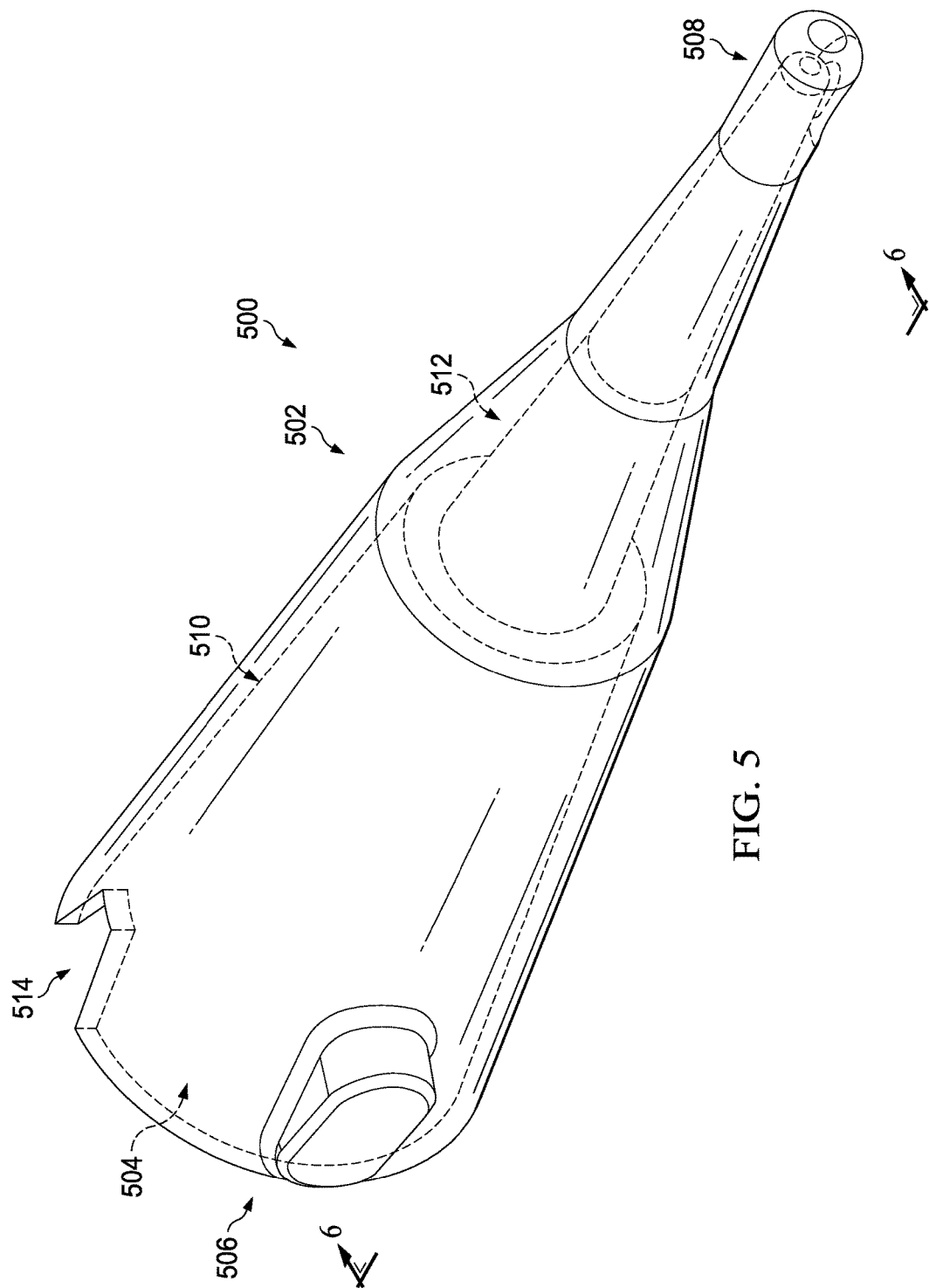
FIG. 5 is an illustration of a transparent isometric view of an application tip in accordance with an illustrative embodiment.

Turning now to FIG. 5, an illustration of a transparent isometric view of an application tip is depicted in accordance with an illustrative embodiment. Application tip 500 may be a physical implementation of application tip 206 of FIG. 2. Application tip 500 may be used to apply a resin to cut edge 402 of composite structure 400 of FIG. 4.

Application tip 500 may have housing 502 and channel 504. Channel 504 may extend in housing 502 from first end 506 towards second end 508. Channel 504 may have conical portion 510 and series of different slopes 512. Conical portion 510 may be complementary to a nozzle (not depicted) of a tool (not depicted) such as nozzle 218 of tool 204 of FIG. 2.

Housing 502 may have number of connections 514. Number of connections 514 may connect housing 502 to a tool.

Figure 6:
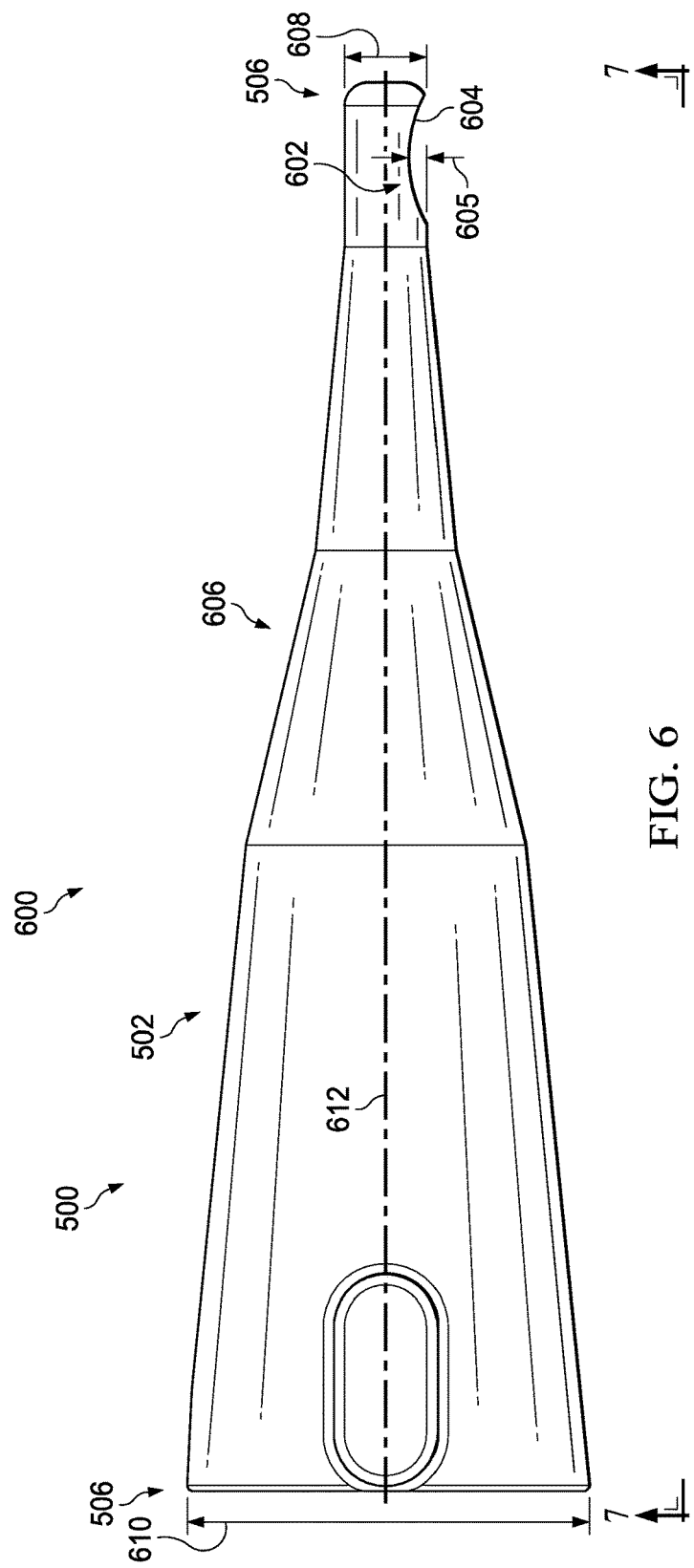
FIG. 6 is an illustration of a side view of an application tip in accordance with an illustrative embodiment.

Turning now to FIG. 6, an illustration of a side view of an application tip is depicted in accordance with an illustrative embodiment. View 600 may be a view of application tip 500 from the direction of lines 6-6 of FIG. 5.

Application tip 500 may have indentation 602. Indentation 602 may be a physical implementation of indentation 256 of FIG. 2. At least a portion of indentation 602 may contact a cut edge of a structure while applying resin to the cut edge.

Indentation 602 may form arc 604 in housing 502. When applying resin to a cut edge (not depicted) of a structure, arc 604 may contact the cut edge of the structure. In some other illustrative examples, indentation 602 may be held at a desirable distance from the cut edge, such as cut edge 254 of FIG. 2.

Depth 605 of indentation 602 may be related to a height of resin to be deposited. For example, a portion of indentation 602 may contact a portion of a cut edge (not depicted) of a structure (not depicted) as application tip 500 moves relative to the structure to form a closed cross-section for the resin (not depicted) between the structure and application tip 500. An example of a closed cross-section for a resin formed by a structure and an application tip may be seen in FIG. 10 described below. In some examples, application tip 500 and the structure may function as a type of moving nip to form a closed cross-section for the resin.

Housing 502 of application tip 500 may have series of different slopes 606. Series of different slopes 606 may be affected by series of different slopes 512 of channel 504 in FIG. 5. Series of different slopes 606 may allow application tip 500 to maneuver in smaller areas. For example, diameter 608 of second end 508 may be smaller than diameter 610 of first end 506 due to series of different slopes 606. Having a smaller diameter may allow an end to maneuver more easily in small areas.

Although series of different slopes 606 is depicted as symmetric around centerline 612 of housing 502, series of different slopes 606 may not be symmetric in some illustrative examples. For example, series of different slopes 606 may have an asymmetric taper. In some examples, a notch may be cut from housing 502. In yet other examples, second end 508 may be bent.

Figure 7:
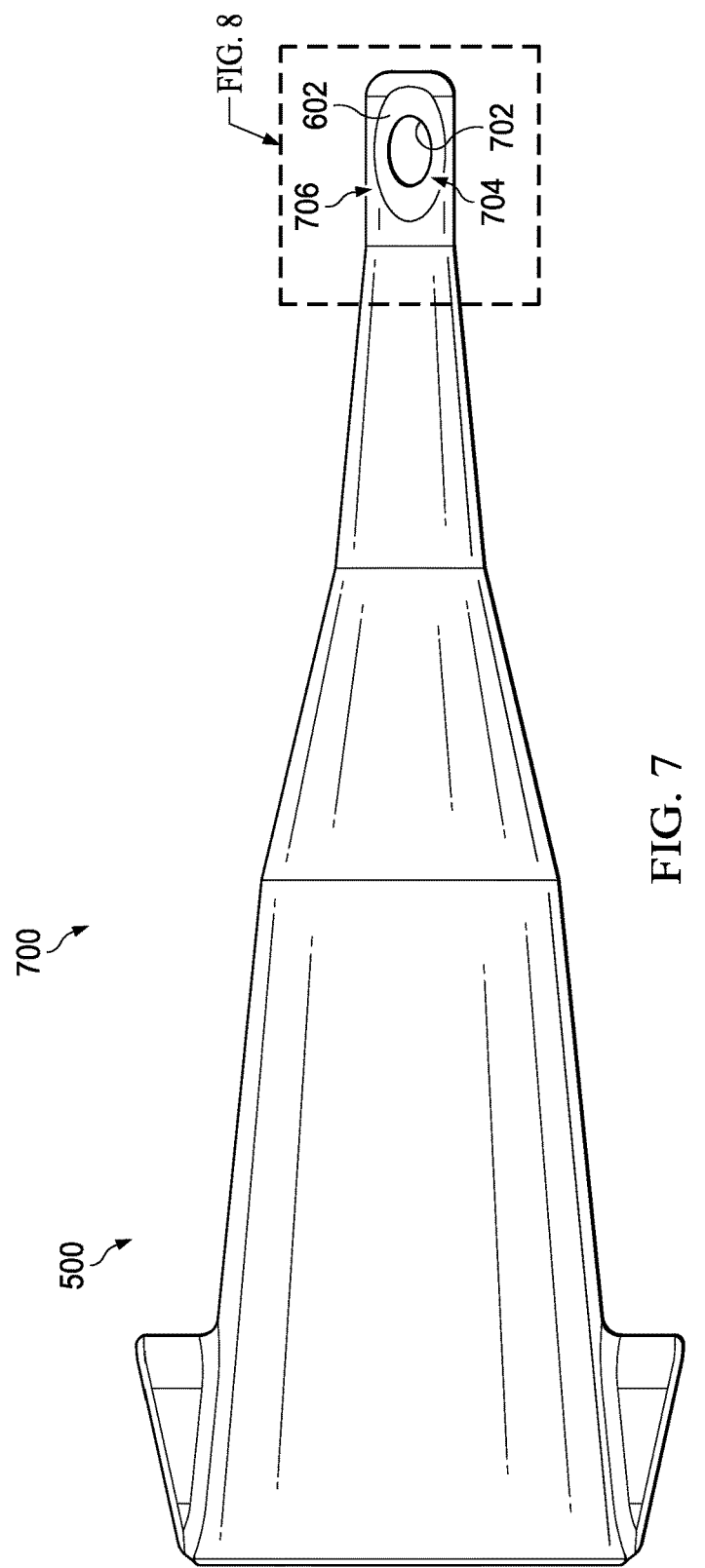
FIG. 7 is an illustration of a bottom view of an application tip in accordance with an illustrative embodiment.

Turning now to FIG. 7, an illustration of a bottom view of an application tip is depicted in accordance with an illustrative embodiment. View 700 may be a view of application tip 500 from the direction of lines 7-7 of FIG. 6.

Application tip 500 may have orifice 702 within indentation 602. Orifice 702 may be concentric with indentation 602. Orifice 702 and indentation 602 may be oblong. In this illustrative example, orifice 702 may be oval 704 and indentation 602 may be oval 706. Resin may flow from application tip 500 through orifice 702.

Figure 8:
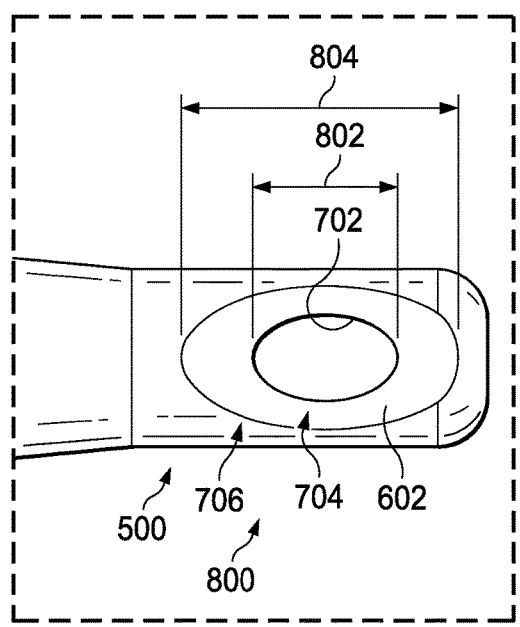
FIG. 8 is an illustration of an orifice and an indentation of an application tip in accordance with an illustrative embodiment.

Turning now to FIG. 8, an illustration of an orifice and an indentation of an application tip is depicted in accordance with an illustrative embodiment. View 800 may be a view of application tip 500 within box FIG. 8 in FIG. 7 rotated counter clockwise 90 degrees.

Application tip 500 may apply resin (not depicted) to a cut edge (not depicted) of a composite structure (not depicted) using orifice 702. The cut edge of the composite structure may have a width at least as large as major axis 802 of oval 704 of orifice 702. The cut edge of the composite structure may have a width equal to or less than major axis 804 of oval 706 of indentation 602. A portion of indentation 602 may contact a portion of the cut edge of the composite structure when a width of the cut edge of the composite structure is equal to or between a width of major axis 802 and a width of major axis 804.

Figure 9:
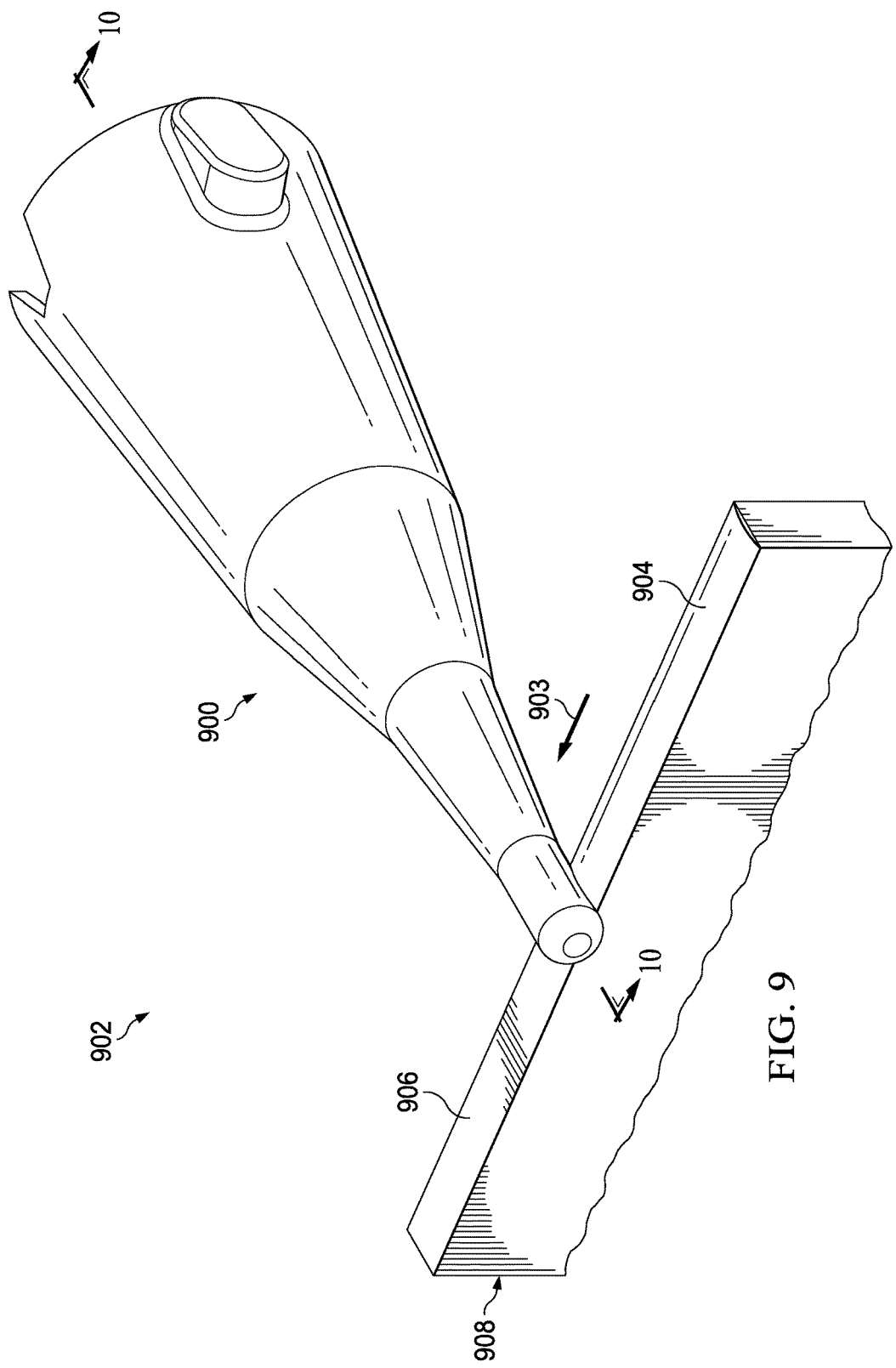
FIG. 9 is an illustration of an isometric view of one implementation of an application tip applying resin to a cut edge of a structure in accordance with an illustrative embodiment.

Turning now to FIG. 9, an illustration of an isometric view of one implementation of an application tip applying resin to a cut edge of a structure is depicted in accordance with an illustrative embodiment. Application tip 900 in view 902 may be a physical implementation of application tip 206 of FIG. 2. In some illustrative examples, application tip 900 may be an illustration of application tip 500 of FIG. 5. Although not depicted in view 902 for simplification, application tip 900 would be connected to a tool having a resin source. In view 902, application tip 900 may move in direction 903 to deposit resin 904 to cut edge 906 of structure 908.

Figure 10:
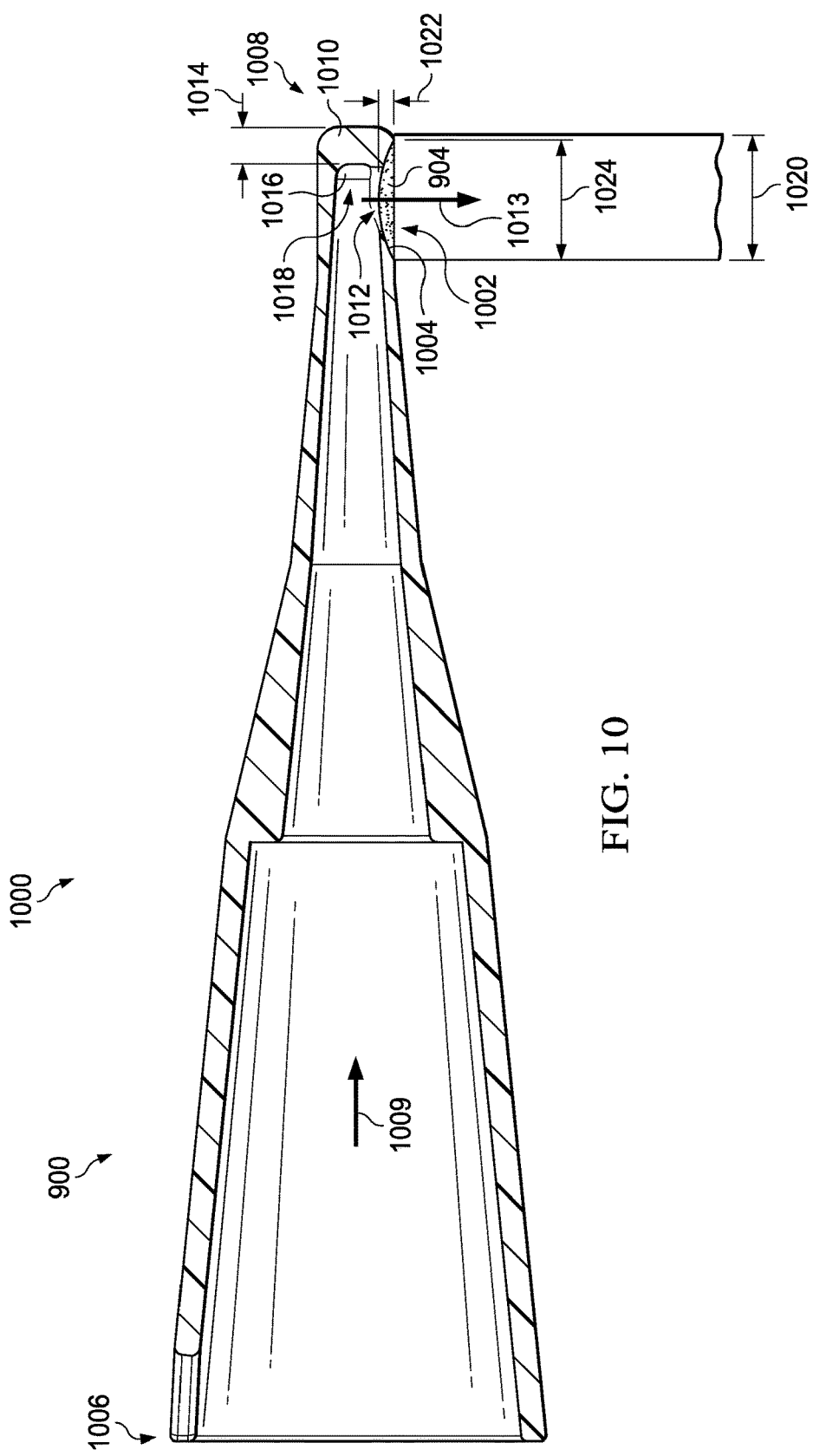
FIG. 10 is an illustration of a cross-sectional view of one implementation of an application tip applying resin to a cut edge of a structure in accordance with an illustrative embodiment.

Turning now to FIG. 10, an illustration of a cross-sectional view of one implementation of an application tip applying resin to a cut edge of a structure is depicted in accordance with an illustrative embodiment. View 1000 may be a view of application tip 900 from the direction of lines 10-10 of FIG. 9.

Cross-section 1002 of resin 904 may be formed by indentation 1004 of application tip 900 and cut edge 906 of structure 908 of FIG. 9. Application tip 900 and structure 908 may function as a type of moving nip to form closed cross-section to shape resin 904.

Resin 904 may flow from first end 1006 to second end 1008 of application tip 900 in direction 1009. Stop 1010 of second end 1008 may direct resin 904 towards orifice 1012. Resin 904 may exit orifice 1012 in direction 1013 to be deposited on cut edge 906 of structure 908. Thickness 1014 of stop 1010 may be sufficient to direct resin 904 towards orifice 1012. Second end 1008 may have interior surface 1016. As depicted, interior surface 1016 may be semi-spherical 1018. In some illustrative examples, interior surface 1016 may be any desirable shape to direct resin 904 towards orifice 1012.

Width 1020 of cut edge 906 of structure 908 may affect at least one of height 1022 or width 1024 of resin 904. If width 1020 of cut edge 906 was smaller, at least one of height 1022 or width 1024 may be smaller. In some illustrative examples, height 1022 of resin 904 in FIG. 10 may also be referred to as a thickness of resin 904. Height 1022 may extend outward from cut edge 906 of structure 908.

Figure 11:
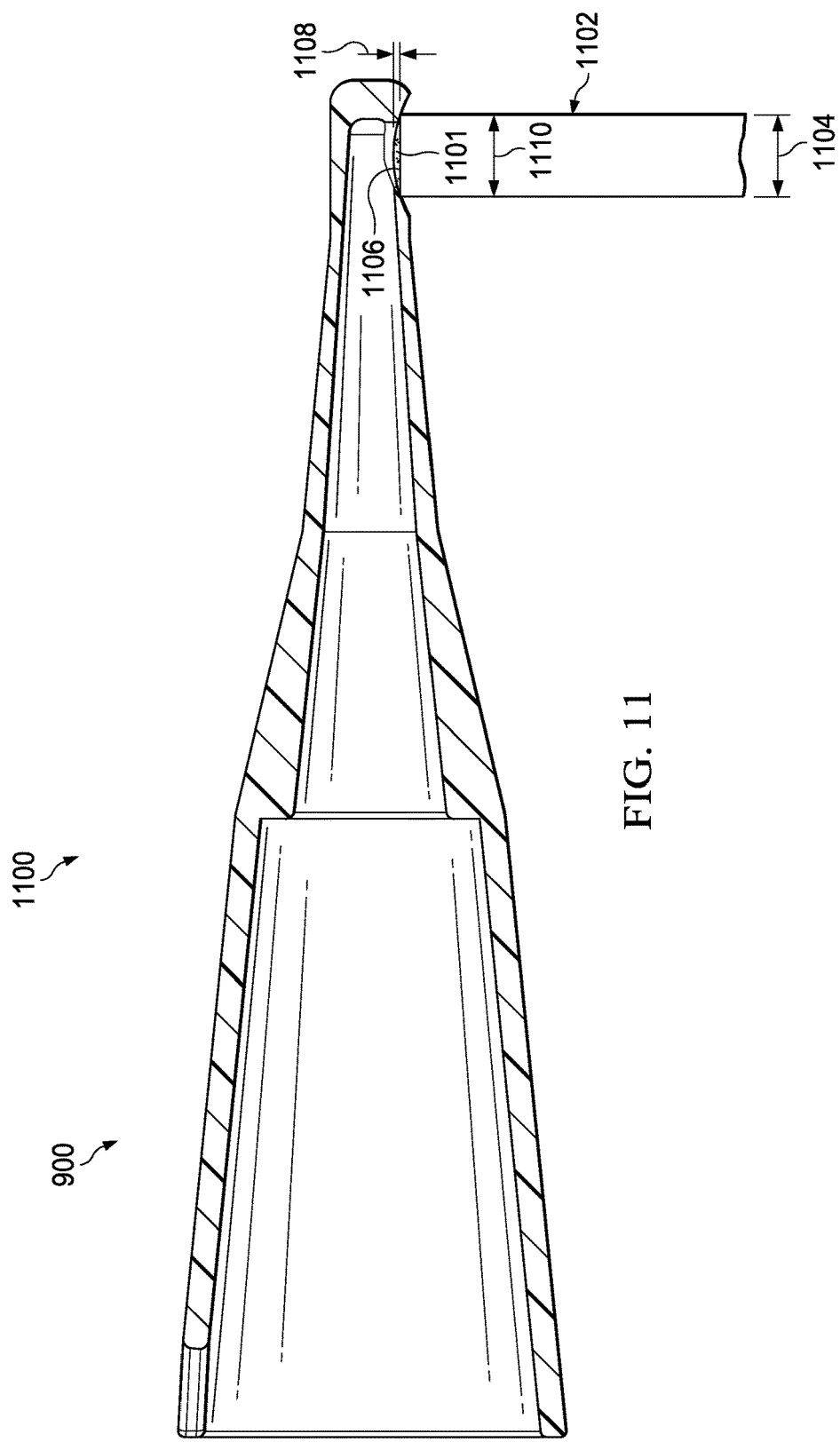
FIG. 11 is an illustration of a cross-sectional view of an application tip applying resin to a cut edge of a structure in accordance with an illustrative embodiment.

Turning now to FIG. 11, an illustration of a cross-sectional view of an application tip applying resin to a cut edge of a structure is depicted in accordance with an illustrative embodiment. View 1100 may be a view of application tip 900 applying resin 1101 to structure 1102. Width 1104 of cut edge 1106 of structure 1102 is less than width 1020 of cut edge 906 of structure 908 in FIG. 10.

As depicted, cut edge 1106 of structure 1102 may contact indentation 1004 to form a moving nip. Height 1108 and width 1110 of resin 1101 may be affected by width 1104 of cut edge 1106 of structure 1102. For example, height 1108 and width 1110 of resin 1101 in FIG. 11 may be less than height 1022 and width 1024 of resin 904 in FIG. 10. In some illustrative examples, height 1108 of resin 1101 in FIG. 11 may also be referred to as a thickness of resin 1101. Height 1108 may extend outward from cut edge 1106 of structure 1102.

Figure 12:
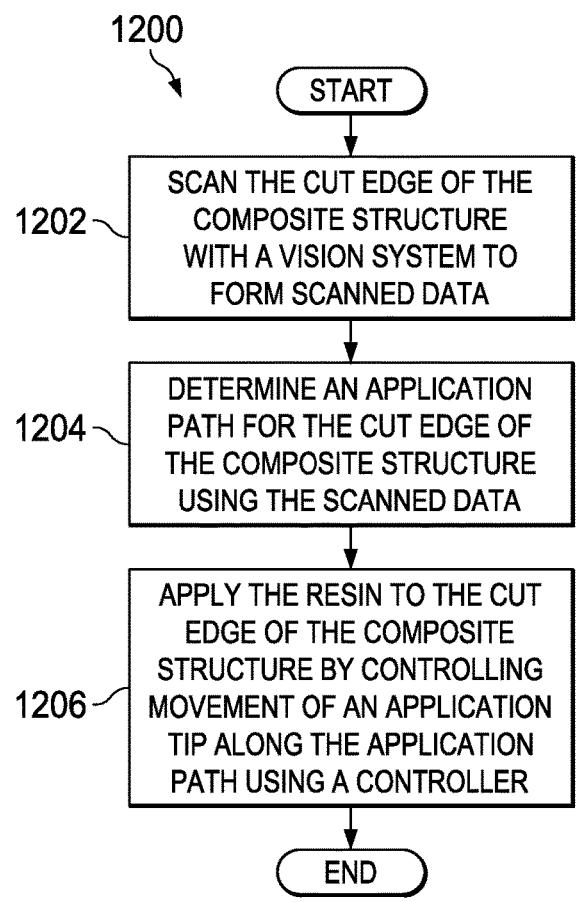
FIG. 12 is an illustration of a flowchart of a process for applying resin to a cut edge of a composite structure in accordance with an illustrative embodiment.

Turning now to FIG. 12, an illustration of a flowchart of a process for applying resin to a cut edge of a composite structure is depicted in accordance with an illustrative embodiment. Process 1200 may be a process for applying resin 214 to cut edge 254 of composite structure 202 of FIG. 2. Process 1200 may be utilized to apply at least one of resin 904 or resin 1101. Process 1200 may utilize at least one of application tip 206 of FIG. 2, application tip 500 of FIGS. 5-8, or application tip 900 of FIGS. 9-11 to apply resin to a cut edge of a composite structure.

Process 1200 may scan the cut edge of the composite structure with a vision system to form scanned data (operation 1202). Scanning the cut edge of the structure may be performed using a vision system. The scanned data may comprise positional data for the structure.

Process 1200 may also determine an application path for the cut edge of the composite structure using the scanned data (operation 1204). The application path may be formed by modifying an approximate path based on differences between design dimensions and the scanned data.

Process 1200 may also apply the resin to the cut edge of the composite structure by controlling movement of an application tip along the application path using a controller (operation 1206). Afterwards, the process terminates. In some illustrative examples, controlling movement of the application tip along the application path using the controller includes moving the application tip such that an indentation of the application tip maintains contact with the cut edge of the composite structure as the application tip moves along the application path. In other illustrative examples, controlling movement of the application tip along the application path using the controller includes moving the application tip such that an orifice of the application tip is maintained a specified distance from the cut edge of the composite structure.

Figure 13:
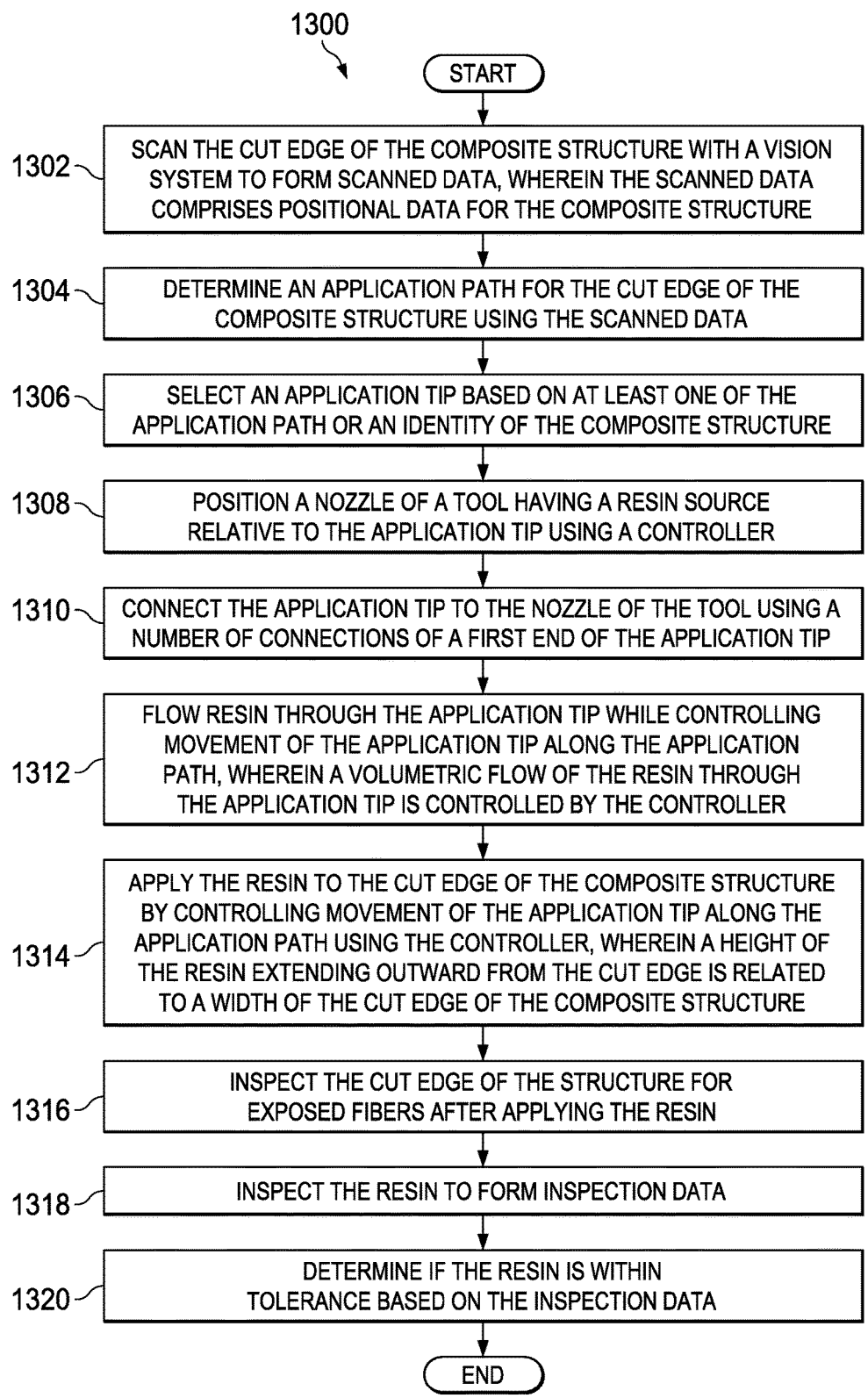
FIG. 13 is an illustration of a flowchart of a process for applying resin to a cut edge of a composite structure in accordance with an illustrative embodiment.

Turning now to FIG. 13, an illustration of a flowchart of a process for applying resin to a cut edge of a composite structure is depicted in accordance with an illustrative embodiment. Process 1300 may be a process for applying resin 214 to cut edge 254 of composite structure 202 of FIG. 2. Process 1300 may be utilized to apply at least one of resin 904 or resin 1101. Process 1300 may utilize at least one of application tip 206 of FIG. 2, application tip 500 of FIGS. 5-8, or application tip 900 of FIGS. 9-11 to apply resin to a cut edge of a composite structure.

Process 1300 may scan the cut edge of the composite structure with a vision system to form scanned data, wherein the scanned data comprises positional data for the composite structure (operation 1302). Scanning the cut edge of the composite structure may be performed using a vision system.

Process 1300 may also determine an application path for the cut edge of the composite structure using the scanned data (operation 1304). The application path may be formed by modifying an approximate path based on differences between design dimensions and the scanned data.

Process 1300 may also select an application tip based on at least one of the application path or an identity of the composite structure (operation 1306). Next, process 1300 may position a nozzle of a tool having a resin source relative to the application tip using a controller (operation 1308).

Process 1300 may also connect the application tip to the nozzle of the tool using a number of connections of a first end of the application tip (operation 1310). Next, process 1300 may flow resin through the application tip while controlling movement of the application tip along the application path, wherein a volumetric flow of the resin through the application tip is controlled by the controller (operation 1312).

Process 1300 may also apply the resin to the cut edge of the composite structure by controlling movement of the application tip along the application path using the controller, wherein a height of the resin extending outward from the cut edge is related to a width of the cut edge of the composite structure (operation 1314). In some illustrative examples, controlling movement of the application tip along the application path using the controller includes moving the application tip such that an indentation of the application tip maintains contact with the cut edge of the composite structure as the application tip moves along the application path. In other illustrative examples, controlling movement of the application tip along the application path using the controller includes moving the application tip such that an orifice of the application tip is maintained at a specified distance from the cut edge of the composite structure.

Process 1300 may also inspect the cut edge of the structure for exposed fibers after applying the resin (operation 1316). If exposed fibers are detected during the inspection, additional resin may be applied to areas of the cut edge determined to have exposed fibers. The additional resin may be applied to the areas of the cut edge determined to have exposed fibers using the application tip. Additional resin may only be applied to those sections of the cut edge that have been determined to have exposed fibers.

Process 1300 may also inspect the resin to form inspection data (operation 1318). Process 1300 may further determine if the resin is within tolerance based on the inspection data (operation 1320). Afterwards the process terminates. The inspection data may be used to determine if a shape of the resin is within tolerance. The inspection data may be used to determine if at least one of a height or a width of the resin is within tolerance. The inspection data may be used to determine if the resin is out of tolerance. Out of tolerance resin may include conditions such as at least one of ripples, bubbles, or other features of the resin.

Turning now to FIG. 14, an illustration of a flowchart of a process for applying resin to a cut edge of a composite structure is depicted in accordance with an illustrative embodiment. Process 1400 may be a process for applying resin 214 to cut edge 254 of composite structure 202 of FIG. 2. Process 1400 may be utilized to apply at least one of resin 904 or resin 1101. Process 1400 may utilize at least one of application tip 206 of FIG. 2, application tip 500 of FIGS. 5-8, or application tip 900 of FIGS. 9-11 to apply resin to a cut edge of a composite structure.

Process 1400 may form a moving nip using the cut edge by placing an application tip in contact with the cut edge (operation 1402). The moving nip may create a closed cross-section to form an exterior shape of the resin.

Process 1400 may also flow the resin through the application tip and onto the cut edge (operation 1404). Process 1400 may further form an exterior shape of the resin using the moving nip by controlling movement of the application tip relative to the cut edge using a controller (operation 1406). Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may be optional and may not be performed.

For example, process 1300 may not inspect the resin to form inspection data in operation 1318 or determine if the resin is within tolerance based on the inspection data in operation 1320. As another example, process 1300 may not inspect the cut edge of the structure for exposed fibers after applying the resin in operation 1316.

As a further example, process 1200 may further flow resin through the application tip while controlling movement of the application tip along the application path. In some illustrative examples, a volumetric flow of the resin through the application tip is controlled by the controller.

Process 1200 may also inspect an exterior shape of the resin after forming. In some examples, process 1200 may also inspect the resin to form inspection data and determine if the resin is within tolerance based on the inspection data.

In some illustrative examples, process 1200 may position a nozzle of a tool having a resin source relative to an application tip using the controller. Process 1200 may then connect the application tip to the nozzle of the tool using a number of connections of a first end of the application tip.

Process 1200 may select the application tip based on at least one of the application path or an identity of the composite structure. For example, each application tip of a plurality of application tips may have a respective sized orifice and a respective sized indentation. In some examples, an application tip may be selected based on the width of the cut edge of the composite structure.

The illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in the form of a block diagram in accordance with an illustrative embodiment. During pre-production, aircraft manufacturing and service method 1500 may include specification and design 1502 of aircraft 1600 of FIG. 16 and material procurement 1504.

During production, component and subassembly manufacturing 1506 and system integration 1508 of aircraft 1600 of FIG. 16 takes place. Thereafter, aircraft 1600 of FIG. 16 may go through certification and delivery 1510 in order to be placed in service 1512. While in service 1512 by a customer, aircraft 1600 of FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in the form of a block diagram in which an illustrative embodiment may be implemented. In this example, aircraft 1600 is produced by aircraft manufacturing and service method 1500 of FIG. 15 and may include airframe 1602 with systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 of FIG. 15. One or more illustrative embodiments may be used during component and subassembly manufacturing 1506. For example, resin may be applied by application tip 206 of FIG. 2 during component and subassembly manufacturing 1506. In some examples, resin may be applied by application tip 206 of FIG. 2 during maintenance and service 1514.

Thus, the illustrative embodiments provide a method and apparatus for applying resin to a cut edge of a structure. Application tip 206 of FIG. 2 may be used to seal the cut edge and cover exposed carbon fibers. Using application tip 206 of FIG. 2 may reduce or eliminate masking steps in producing a structure. By reducing or eliminating masking steps, the use of application tip 206 may reduce the time of manufacturing the structure. Further, the use of application tip 206 to apply resin may reduce the involvement of human operators in forming seals. By reducing the involvement of human operators, the amount of labor to apply seals to a structure may be reduced. By reducing the involvement of human operators, manufacturing time for the seals may be reduced. Further, by forming seals using application tip 206 of FIG. 2, the shape of the resulting seal may be repeatable. Resin 214 of FIG. 2 deposited by application tip 206 may have a higher quality pass rate for shape than seals formed by hand by human operators. As a result of having a higher quality pass rate, rework or discarded seals may be reduced. Application tip 206 may reduce manufacturing cost by reducing at least one of manufacturing time, labor costs, labor times, or rework quantity.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of applying resin to a cut edge of a composite structure, the cut edge having exposed carbon fibers, and the method comprising:
   scanning the cut edge of the composite structure with a vision system to form scanned data;
   determining an application path along the cut edge of the composite structure using the scanned data;
   applying the resin to the cut edge of the composite structure by a controller controlling moving an orifice dispensing a resin from an application tip along the application path;
   flowing, from a first end of the application tip to a second end of the application tip, the resin through the application tip, wherein-the application tip comprises:
      an exterior surface comprising a circular cross section;
      an indentation, for a first length along a longitudinal axis of the application tip shorter than a second length of the application tip, the indentation extending from the exterior surface inwardly and comprising an orifice comprising a third length, shorter than the first length, and located within the indentation; and
      the second end the second end comprising a semi-spherical interior surface extending radially inwardly perpendicular to the orifice.

2. The method of claim 1, wherein the scanned data comprises positional data for the composite structure.

3. The method of claim 1, wherein a volumetric flow of the resin through the application tip is controlled by the controller.

4. The method of claim 1, wherein an exterior shape of the resin extends outward from the cut edge of the composite structure, the exterior shape formed by the application tip in contact with the cut edge.

5. The method of claim 4 further comprising:
   inspecting the cut edge of the composite structure for exposed fibers after applying the resin.

6. The method of claim 5 further comprising:
   applying additional resin to a portion of the cut edge determined to have the exposed fibers after inspecting the cut edge.

7. The method of claim 4 further comprising:
   inspecting the resin to form inspection data; and
   determining if the resin is within tolerance based on the inspection data.

8. The method of claim 1, further comprising:
   positioning, using the controller, relative to the application tip, a nozzle of a tool comprising a resin source; and
   connecting the application tip to the nozzle of the tool using a number of connections of the first end of the application tip.

9. The method of claim 1, further comprising includes moving the application tip such that maintaining the indentation of the application tip in contact with the cut edge of the composite structure with the application tip moving along the application path.

10. The method of claim 1, further comprising moving the application tip in contact with the cut edge and forming an exterior shape of the resin.

11. The method of claim 1, wherein the indentation of the application tip does not contact the cut edge of the composite structure as the application tip moves along the application path.

12. The method of claim 1 further comprising:
selecting the application tip based on at least one of the application path or an identity of the composite structure.

13. The method of claim 1, wherein the application tip has an end sized to rotate and maneuver within a first cutout having a first corner radius and to rotate and maneuver within a second cutout having a second corner radius, and wherein the first corner radius and the second corner radius are different.

14. The method of claim 1, wherein the cut edge of the composite structure further comprises a curved portion with a number of cutouts, and wherein the application tip is configured to apply resin to the number of cutouts.

15. A method of applying resin to a cut edge of a composite structure, the cut edge having exposed carbon fibers, and the method comprising:
forming a moving nip using the cut edge by placing an application tip in contact with the cut edge;
flowing, from a first end of the application tip to a second end of the application tip, the resin onto the cut edge, the application tip comprising:
an exterior surface comprising a circular cross section;
an indentation, for a first length along a longitudinal axis of the application tip shorter than a second length of the application tip, the indentation extending from the exterior surface inwardly and comprising an orifice comprising a third length, shorter than the first length, and located within the indentation
forming, using the moving nip, an exterior shape of the resin via a controller controlling moving an orifice, dispensing a resin from the application tip, relative to the cut edge; and
the second end comprising a semi-spherical interior surface extending radially inwardly perpendicular to the orifice.

16. The method of claim 15 further comprising:
inspecting, after applying the resin, the cut edge of the composite structure, and forming inspection data;
determining a portion of the cut edge has exposed fibers using the inspection data; and
applying additional resin to the portion of the cut edge having exposed fibers using the application tip.

17. The method of claim 15, wherein the application tip has an end sized to rotate and maneuver within a first cutout having a first corner radius and to rotate and maneuver within a second cutout having a second corner radius, and wherein the first corner radius and the second corner radius are different.

18. The method of claim 15, wherein the cut edge of the composite structure further comprises a curved portion with a number of cutouts, and wherein the application tip is configured to apply resin to the number of cutouts.

\* \* \* \* \*